Patented Sept. 13, 1938

2,130,104

UNITED STATES PATENT OFFICE 2,130,104

STORAGE BATTERY PLATE AND METHOD OF MAKING THE SAME

John A. Schaeffer and Harold R. Harner, Joplin, Mo., assignors to The Eagle-Picher Lead Company, Cincinnati, Ohio, a corporation of Ohio No Drawing. Application June 25, 1935, Serial No. 28,357

12 Claims. (Cl. 136—26)

Our invention relates to the manufacture of storage battery plates of the lead acid type and has for its object to provide a negative plate and a method for manufacturing the same, which plate as compared with plates previously manufactured will have its active material in such a condition of particle sub-division and physical structure as to yield markedly increased initial capacity particularly in high rate and low temperature discharge, and to maintain that increased yield longer during the use of the plate than has heretofore been possible.

Our invention consists in the preparation of an organic compound and the incorporation of this compound into the active material or material to be made active in a lead acid storage battery plate either prior to or after incorporation into the storage battery grid and which readily combines with the lead compound or lead compounds or finely divided metallic lead to produce on formation spongy-lead crystals or particles which are submicroscopic in size, thereby increasing tremendously the specific surface of the active material in the plate as compared with the active material of plates made from the same lead compound or compounds or finely divided metallic lead but without our organic compound.

In the preparation of our organic compound we use as the raw material certain carbohydrates comprising plant residue or agricultural waste of the group including tanbark, straw, sawdust, corn stalks, or leaves, and from this we prepare a compost by aerobic decomposition. We may select straw as an example. To 1,000 parts by weight of straw we add water equal to 3,000 parts by weight, an ammonium salt 50 parts by weight, lime 50 parts by weight, and phosphate 50 parts by weight. In place of the ammonium salt we may substitute nitrate or urea. The compost is allowed to undergo decomposition during a period of 6 to 12 weeks, with proper aeration. To approximately 3,000 parts of this compost with a moisture content of substantially 30% we add 30,000 parts of water, as well as an alkali, of which caustic soda is an example, 600 parts by weight. The whole is then placed in a container and kept at boiling temperature for a period of approximately 12 hours and then allowed to cool, during which time the solid particles settle to the bottom and the supernatant clear liquor is decanted into another tank. The solid residue remaining in the tank is again admixed with water and additional caustic soda sufficient to maintain the alkalinity of the solution, and boiled for an additional period of 12 hours when the whole is allowed to cool and settle.

The resultant liquor is removed to the tank with the previous batch. To the combined liquors is added a mineral acid, of which sulphuric acid is an example, with a specific gravity of approximately 1.835. A precipitate is formed, which is filtered off, washed and allowed to dry. This precipitate is now treated with alcohol, either methyl or ethyl which dissolves a part of the precipitate. Other reagents, of which acetone and other alcohols and ketones are examples, may also be used for this purpose. The alcohol extract is evaporated to dryness and the alcohol soluble material permitted to dry. The resulting compound is added to the active material or material to be made active in a lead acid storage battery plate and when made into a paste with desirable vehicle, applied to storage battery grids and treated by suitable means in process forms a storage battery plate characterized by increased initial capacity particularly in high rate and low temperature discharge.

Without desiring to restrict ourselves to the proportions named, we have found that good results can be achieved by the mixture of one part by weight of our organic compound with five hundred parts by weight of the lead materials used in compounding the paste for the plates, giving 0.2% of organic material in the dry blend. Again, we may form a lead salt or complex of our organic compound by adding lead oxide such as litharge, or a lead salt, to a solution of our organic material, whereupon a precipitate of lead-organic salt or complex is formed. The amount of organic compound in the lead-organic complex may be varied at will by varying the relative amount of lead material or lead salt added, although we prefer to form a lead-organic complex containing about 5% by weight of organic material. This lead-organic complex may then be dried, pulverized, and added to the other lead material used in compounding the paste for the plates so as to provide the desired amount of organic compound in the dry blend. It is understood that the percentages named are approximate only, and that we may vary them with the type of lead materials used, and with the results desired. We have used up to 1% by weight of our organic compound with good results, and for special purposes even more than that amount might be desirable.

To prepare our active material we add certain lead compounds comprising lead oxide or a mixture of lead oxides of the group including litharge, red lead, orange mineral, basic lead sulphate, or lead suboxide with or without finely divided metallic lead, or we may use finely divided metallic lead alone, and place these in a mixer where the whole is brought to pasting consistency by the addition of acid (preferably sulphuric) with or without the addition of water. To this we then add our organic compound or a precipitate formed by the addition of lead oxide or lead salt to a solution of our organic compound and the mixer is again operated until the ingredients are thoroughly compounded. In place of adding our organic compound separately we may add it simultaneously with the other materials, and instead of adding it in the wet mix it may be added in the dry blend, the same results being achieved regardless of the method by which our material is added.

By our invention the active material produced from the paste by the forming of the plates and their use in a battery has greatly increased capacity, especially at high rates of discharge and at low temperature, due to the extremely fine state of particle subdivision produced in the spongy-lead active material, which quality enables us to produce a plate of superior performance without loss of either efficiency or durability as compared with battery plates previously prepared.

Having thus described our invention what we claim as new and desire to secure by Letters Patent, is:

1. A paste for lead-acid storage battery plates consisting of one or more oxides of lead thoroughly mixed with a substance resulting from the treatment of a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol and evaporating the alcohol.

2. A paste for lead-acid storage battery plates consisting of finely divided metallic lead thoroughly mixed with a substance resulting from the treatment of a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol and evaporating the alcohol.

3. A paste for lead-acid storage battery plates consisting of finely divided metallic lead together with one or more oxides of lead, thoroughly mixed with a substance resulting from the treatment of a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol and evaporating the alcohol.

4. The method of preparing a paste for use in the manufacture of lead-acid storage battery plates which comprises mixing a lead compound or lead compounds with a precipitate resulting from the treatment of a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol and evaporating the alcohol.

5. The method of controlling the activity of lead-acid storage battery plates comprising the addition of one or more oxides of lead to a precipitate resulting from the treatment of a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol and evaporating the alcohol.

6. The method of preparing paste for lead-acid storage battery plates, characterized by the presence of spongy-lead particles which are submicroscopic in size, comprising treating a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol, evaporating the alcohol, and mixing the resultant precipitate with finely divided metallic lead.

7. A lead-acid storage battery plate, the active material of which comprises spongy-lead particles which are submicroscopic in size, consisting of one or more oxides of lead mixed with a precipitate resulting from the treatment of a compost of carbohydrates comprising plant residue or agricultural waste of the group including tanbark, straw, sawdust, corn stalks or leaves, with an alkaline solution, boiling the mixture, separating the resultant liquor, precipitating the organic complex from the alkaline liquor by means of sulphuric acid, filtering and drying the resulting precipitate, extracting the precipitate with alcohol, evaporating the alcohol.

8. The method of preparing a paste for use in the manufacture of lead acid storage battery plates which comprises mixing finely divided metallic lead together with a lead compound or lead compounds and a substance resulting from the treatment of a compost of carbohydrates comprising plant residue or agricultural waste of the group including tanbark, straw, sawdust, cornstalks, or leaves with an alkaline solution, boiling the mixture, separating the resultant liquor, precipitating the organic complex from the alkaline liquor by means of sulphuric acid, filtering and drying the resulting precipitate, extracting the precipitate with alcohol and evaporating the alcohol.

9. The method of preparing a paste for lead acid storage battery plates which comprises mixing one or more oxides of lead selected from the group consisting of litharge, red lead, orange mineral, basic lead sulphate, or lead suboxide with a substance resulting from the treatment of a compost of carbohydrates comprising plant residue or agricultural waste of the group including tanbark, straw, sawdust, cornstalks, or leaves with an alkaline solution, boiling the mixture, separating the resultant liquor, precipitating the organic complex from the alkaline liquor by means of sulphuric acid, filtering and drying the resulting residue, extracting the residue with alcohol and evaporating the alcohol.

10. The method of preparing a paste for lead acid storage battery plates which comprises mixing finely divided metallic lead together with one or more oxides of lead selected from the group consisting of litharge, red lead, orange mineral, basic lead sulphate, or lead suboxide with a substance resulting from the treatment of a compost of carbohydrates comprising plant residue or agricultural waste of the group including tanbark, straw, sawdust, cornstalks, or leaves with an alkaline solution, boiling the mixture, separating the resultant liquor, precipitating the organic complex from the alkaline liquor by means of sulphuric acid, filtering and drying the resulting residue, extracting the residue with alcohol and evaporating the alcohol.

11. A paste for lead acid storage battery plates consisting of finely divided metallic lead together with one or more oxides of lead selected from the group consisting of litharge, red lead, orange mineral, basic lead sulphate, or lead suboxide and an alcohol soluble organic substance resulting from the treatment of a compost of carbohydrates comprising plant residue or agricultural waste of the group including tanbark, straw, sawdust, cornstalks, or leaves with an alkaline solution, boiling the resultant mixture, separating the resulting liquor, precipitating the organic complex from the alkaline liquor by means of sulphuric acid, filtering and drying the resulting residue, extracting the residue with alcohol and evaporating the alcohol.

12. A paste for lead acid storage battery plates consisting of one or more oxides of lead selected from the group consisting of litharge, red lead, orange mineral, basic lead sulphate, or lead suboxide, and a substance consisting of an alcohol soluble organic complex resulting from the treatment of a compost of carbohydrates comprising plant residue or agricultural waste of the group including tanbark, straw, sawdust, cornstalks, or leaves, with an alkaline solution, boiling the mixture, separating the resultant liquor, precipitating the organic complex from the alkaline liquor by means of sulphuric acid, filtering and drying the resulting residue, extracting the residue with alcohol and evaporating the alcohol.

JOHN A. SCHAEFFER.
HAROLD R. HARNER.